US012417773B2

(12) United States Patent
Baumgarte

(10) Patent No.: US 12,417,773 B2
(45) Date of Patent: Sep. 16, 2025

(54) STEREO-BASED IMMERSIVE CODING

(71) Applicant: Apple Inc., Cupertino, CA (US)

(72) Inventor: Frank Baumgarte, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 18/019,226

(22) PCT Filed: Aug. 20, 2021

(86) PCT No.: PCT/US2021/046810
§ 371 (c)(1),
(2) Date: Feb. 1, 2023

(87) PCT Pub. No.: WO2022/046533
PCT Pub. Date: Mar. 3, 2022

(65) Prior Publication Data

US 2023/0274747 A1 Aug. 31, 2023

Related U.S. Application Data

(60) Provisional application No. 63/071,149, filed on Aug. 27, 2020.

(51) Int. Cl.
*G10L 19/008* (2013.01)
*G10L 19/02* (2013.01)
(Continued)

(52) U.S. Cl.
CPC ........ *G10L 19/008* (2013.01); *G10L 19/0204* (2013.01); *H04S 1/007* (2013.01); (Continued)

(58) Field of Classification Search
CPC ... G10L 19/008; G10L 19/0204; H04S 1/007; H04S 3/008; H04S 7/302; H04S 2400/01; (Continued)

(56) References Cited

U.S. PATENT DOCUMENTS 8,379,868 B2 2/2013 Goodwin et al.
9,892,737 B2 * 2/2018 Purnhagen ............ G10L 19/018
(Continued)

FOREIGN PATENT DOCUMENTS

CN 101658052 A 2/2010
CN 106663432 A 5/2017
(Continued)

OTHER PUBLICATIONS

International Search Report and Written Opinion for International Application No. PCT/US2021/046810 mailed Dec. 6, 2021, 15 pages.

(Continued)

*Primary Examiner* — Jason R Kurr
(74) *Attorney, Agent, or Firm* — Aikin & Gallant, LLP

(57) ABSTRACT

Disclosed is an audio codec that represents an immersive signal by a two-channel stereo signal that is a stereo rendering of the immersive signal and directional parameters. The directional parameters may be based on a perceptual model describing the direction of virtual speaker pairs to recreate the perceived location of dominant sounds. Audio processing at the decoder may be performed on the stereo signal in the frequency domain for multiple channel pairs using time-frequency tiles. Spatial localization of the audio signals may use a panning approach by applying weightings to the time-frequency tiles of the stereo signal for each output channel pair. The weightings for the time-frequency tiles may be derived based on the directional parameters, an analysis of the stereo signal, and the output channel layout. The weightings may be used to adaptively process the time-frequency tiles using a de-correlator to reduce or minimize spectral distortions from spatial rendering.

20 Claims, 15 Drawing Sheets

(51) Int. Cl.

| | |
|---|---|
| ***H04S 1/00*** | (2006.01) |
| ***H04S 3/00*** | (2006.01) |
| ***H04S 7/00*** | (2006.01) |

(52) U.S. Cl.
CPC .............. *H04S 3/008* (2013.01); *H04S 7/302* (2013.01); *H04S 2400/01* (2013.01); *H04S 2400/11* (2013.01); *H04S 2420/07* (2013.01)

(58) Field of Classification Search
CPC ............. H04S 2400/03; H04S 2400/11; H04S 2420/07
See application file for complete search history.

(56) References Cited

U.S. PATENT DOCUMENTS

| | | | | |
|---|---|---|---|---|
| 2007/0269063 | A1* | 11/2007 | Goodwin | G10L 19/008 381/310 |
| 2016/0232901 | A1* | 8/2016 | Ghido | G10L 19/008 |
| 2018/0359596 | A1 | 12/2018 | Breebaart et al. | |
| 2019/0394606 | A1 | 12/2019 | Tammi et al. | |

FOREIGN PATENT DOCUMENTS

| | | | |
|---|---|---|---|
| GB | 2559765 | | 8/2018 |
| GB | 2572419 | | 10/2019 |
| WO | 2008113427 | A1 | 9/2008 |
| WO | 2016001356 | A1 | 1/2016 |
| WO | 2017087650 | | 5/2017 |
| WO | 2019185979 | A1 | 10/2019 |

OTHER PUBLICATIONS

Baumgarte, Frank, et al., "Binaural Cue Coding—Part I: Psychoacoustic Fundamentals and Design Principles," IEEE Transactions on Speech and Audio Processing, vol. 11, No. 6, Nov. 2003, pp. 509-519.

202180052259.9, "The patent office of the People's Republic of China, Notification of the first Office Action", mailed May 12, 2025, 9 pages.

* cited by examiner

STEREO-BASED IMMERSIVE CODING

This patent application is a national phase entry of PCT/US2021/046810 filed 20 Aug. 2021 which claims the benefit of U.S. Provisional Application No. 63/071,149 filed on Aug. 27, 2020.

FIELD

This disclosure relates to the field of audio communication; and more specifically, to digital signal processing methods designed to deliver immersive audio content using stereo signals. Other aspects are also described.

BACKGROUND

Consumer electronic devices are providing digital audio coding and decoding capability of increasing complexity and performance. Traditionally, audio content is mostly produced, distributed and consumed using a two-channel stereo format that provides a left and a right audio channel. Recent market developments aim to provide a more immersive listener experience using richer audio formats that support multi-channel audio, object-based audio, and/or ambisonics, for example Dolby Atmos or MPEG-H.

Delivery of immersive audio content is associated with a need for larger bandwidth, i.e. increased data rate for streaming and download compared to that for stereo content. If bandwidth is limited, techniques are desired to reduce the audio data size while maintaining the best possible audio quality. A common bandwidth reduction approach in perceptual audio coding takes advantage of the perceptual properties of hearing to maintain the audio quality. For example, at the lowest bitrates, audio coding may take advantage of parametric approaches that enable bitrate-efficient encoding of certain sound features so that the features can be approximately recreated in the decoder. Examples for parametric surround audio coding are MPEG Surround or Binaural Cue Coding (BCC), which can use spatial parameters to re-create a multi-channel audio signal from a mono audio signal. To deliver richer and more immersive audio content using limited bandwidth, other audio coding and decoding (codec) techniques are desired.

SUMMARY

Disclosed are aspects of a new immersive audio codec that may re-create immersive audio experience based on a two-channel stereo signal and directional parameters. The stereo signal is a high-quality stereo rendering of the immersive audio signal and the directional parameters may be based on a perceptual model that derives parameters describing the perceived direction of dominant sounds. The immersive audio signal may include multi-channel audio, audio objects, or higher-order ambisonics (HOA), which describe a sound field based on spherical harmonics. For example, when the immersive audio signal is a multi-channel input of greater than two channels, it may be down-mixed to a stereo signal. When the immersive audio signal represents audio objects or HOA components, the objects or HOA components may be rendered to a stereo signal. The stereo signal and the directional parameters may be encoded and transmitted by an encoder to a decoder for reconstruction and playback.

At the decoder, the decoded stereo signal may be transformed from the time domain into the frequency domain and split into time-frequency tiles. The left and right signals of the time-frequency tiles may be processed in parallel by multiple processing units, each processing unit being associated with a pair of playback channels or speakers. Weighting factors may be applied to the tiles to generate the corresponding weighted time-frequency tiles for the output channel pair. Given the playback channel layout, the weighting factors may be controlled to create a perceived direction from which the audio signal of the time-frequency tile will be heard in the multi-channel playback system through spatial rendering. The directional parameters received from the encoder may represent perceived directions of dominant sounds in the sub-bands of the time-frequency tiles and may be used by the decoder to control the weighting factors.

In one aspect, the decoder may control the weighting factors based on an analysis of the stereo signal and the directional parameters to reduce the correlation between channel pairs. Decorrelation may be applied to reduce comb-filter effects that may cause large image shifts in the perceived audio signals when the listener moves. These effects may be pronounced in audio signals with smooth envelope and high prediction gain. The decoder may analyze the stereo signal and the directional parameters to generate the weighting factors for decorrelation and to estimate the amount of decorrelation for each time-frequency tile. In one aspect, to mitigate distortions due to spatial rendering such as unstable images caused by concurrent sources being present in different directions or temporal smearing of attack caused by transient signals, the decoder may estimate the temporal fluctuation of the dominant perceived direction in the sub-bands of the time-frequency tiles to control the weighting factor generation.

After applying the weighting factors to the time-frequency tiles of the channel pairs for spatial rendering, the weighted time-frequency tiles are merged to transform the left and right signals of each channel pair from the frequency domain back to the time domain. The time domain signals for the channel pairs may be combined to generate the signals for the speakers of the multi-channel playback system. In one aspect, the stereo signal may be used as a fallback audio signal for systems that are not capable of decoding the directional parameters, that only have a stereo playback system, or where a stereo signal is preferred for headphone playback.

Advantageously, to provide bitrate reduction, aspects of the disclosure reduce the number of audio channels that are transmitted to two channels. For the directional parameters, it uses only a small amount of side information that is significantly lower than the bitrate needed for a single audio channel. Signal processing is performed based on the directional parameters and an analysis of the stereo signal to reduce or minimize spectral distortions due to spatial rendering using techniques such as temporal smoothing of the weighting factors and decorrelation. The audio quality of the immersive audio content may be enhanced while achieving bitrate reduction.

In one aspect, a method for encoding audio content is disclosed. The method includes generating a two-channel stereo signal from audio content such as an immersive audio signal. The method also includes generating directional parameters based on the audio content. The directional parameters describe the optimum direction of virtual speaker pairs to recreate the perceived dominant sound location of the audio content in multiple frequency sub-bands. The method further includes transmitting the two-channel stereo signal and the directional parameters over a communication channel to a decoding device In one aspect, a method for decoding audio content is disclosed. The method includes receiving a two-channel stereo signal and directional parameters from an encoding device. The directional parameters describe the optimum direction of virtual speaker pairs to recreate the perceived dominant sound location of audio content represented by the two-channel stereo signal in a number of frequency sub-bands. The method also includes generating multiple time-frequency tiles for a number of channel pairs of a playback system from the two-channel stereo signal. The multiple time-frequency tiles represent a frequency-domain representation of each channel of the two-channel stereo signal in multiple frequency sub-bands. The method further includes generating weighting factors for the multiple time-frequency tiles of the multiple channel pairs based on the directional parameters. The method further includes applying the weighting factors to the multiple time-frequency tiles to spatially render the time-frequency tiles over the multiple channel pairs of the playback system.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
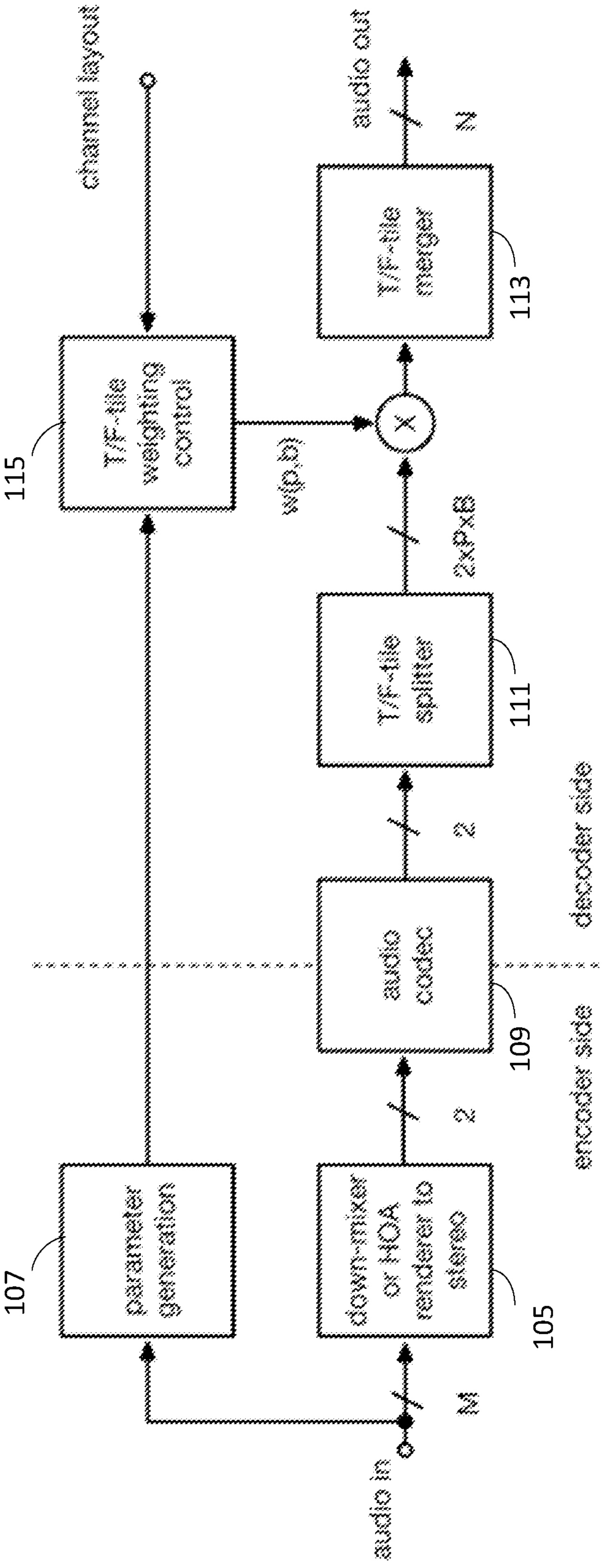
FIG. 1 is a functional block diagram of a stereo-based immersive audio coding system according to one aspect of the disclosure.

It is desirable to provide immersive audio content over a transmission channel of limited bandwidth from an audio source to a playback system while maintaining the best possible audio quality. The immersive audio content may include multi-channel audio, audio objects, or spatial audio reconstructions known as ambisonics, which describe a sound field based on spherical harmonics that may be used to recreate the sound field for playback. Ambisonics may include first order or higher order spherical harmonics, also known as higher-order ambisonics (HOA). The immersive audio content may be rendered into audio content of lower bitrate and spatial parameters may be generated to take advantage of the perceptual properties of hearing. An encoder may transmit the lower bitrate audio content and the spatial parameters over the limited bandwidth channel to allow a decoder to reconstruct the immersive audio experience.

Systems and methods are disclosed for an immersive audio coding technique that recreates an immersive audio experience based on a two-channel stereo signal and directional parameters. Audio processing at the decoder may be performed on the left and right signals of the stereo signal in the frequency domain for multiple channel pairs using time-frequency tiles. The directional parameters may indicate the optimum direction of virtual speaker pairs to recreate the perceived dominant sound location for the time-frequency tiles. Spatial localization of the decoded audio signals may use a panning approach of the stereo signal in the median plane between channel pairs of a multi-channel playback system by applying weighting factors to the time-frequency tiles of the stereo signal for each output channel pair. The decoder may derive the weighting factors for the time-frequency tiles based on the directional parameters describing the virtual speaker pair directions, an analysis of the decoded stereo signal, and the output channel layout. The weighting factors may be used to adaptively process the time-frequency tiles using a de-correlator to reduce or minimize spectral distortions from the spatial rendering of the coding technique.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the elements or features in use or operation in addition to the orientation depicted in the figures. For example, if a device containing multiple elements in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 is a functional block diagram of a stereo-based immersive coding (STIC) system according to one aspect of the disclosure. The audio input to the STIC system may include various immersive audio input formats such as multi-channel audio, audio objects, HOA. It is understood that the HOA may also include first-order ambisonics (FOA). To reduce the data bitrate, a down-mixer/renderer module 105 may reduce the audio input to a two-channel stereo signal. In the case of a multi-channel input, M channels of a known input channel layout may be present, such as a 7.1.4 layout (7 loudspeakers in the median plane, 4 loudspeakers in the upper plane, 1 low-frequency effects (LFE) loudspeaker). The down-mixer/renderer module 105 may down-mix the multi-channel input except the LFE channel to a stereo signal. In the case of audio objects, all M objects may be first rendered by the down-mixer/renderer 105 to a stereo signal. In the case of HOA, there may be M HOA components, where M depends on the HOA order. The down-mixer/renderer 105 may render the HOA signal to a stereo signal. The two-channel stereo signal may be referred to as the right channel and the left channel signals.

The stereo audio signal may be encoded by the encoder of an audio codec 109 to reduce the audio bitrate. Audio codec 109 may use any known coding and decoding techniques and is not further elaborated. A parameter generation module 107 may generate a spatial image parameter description of the audio input. The spatial image parameters are used by the decoder side or a receiver of the STIC system to reconstruct the immersive audio content from the stereo signal. In one aspect, the spatial image parameters may be parameters describing the optimum direction of virtual speaker pairs to recreate the perceived location of dominant sounds. In one aspect, the spatial image parameters may be encoded before transmission. The encoder side or a transmitter of the STIC system may transmit the encoded stereo signal and the spatial image parameters to the decoder side over a bandwidth-limited channel. In one aspect, the bandwidth-limited channel may be a wired or a wireless communication medium. In another aspect, the encoder side may encode the stereo signal and the spatial image parameters to reduce or minimize the file size for storage. The decoder side may later retrieve the stored file containing the encoded stereo signal and the encoded spatial image parameters for decoding and playback.

At the decoder side, the encoded stereo signal may be decoded by the decoder of the audio codec 109. A time-frequency-tile splitter 111 may transform the decoded stereo signal from the time domain into the frequency domain, such as through short-time Fourier transform (STFT), to generate B tiles across the frequency domain. Each of the B tiles may represent a frequency sub-band of the decoded stereo signal of a certain time duration. The number of sub-bands B may be determined by the desired spectral resolution. In one aspect, each sub-band may include a grouping of multiple frequency bins from the STFT. In one aspect, the decoded audio signal may be partitioned into blocks of fixed time duration, also called the frame size, to be represented by the B tiles in the frequency domain. The frequency-domain representation of the stereo signal may be split or copied into P parallel processing path, where each processing path may be associated with a pair of playback channels or speakers. Thus, the stereo signal may be split into PxB time-frequency tiles with each tile representing one sub-band of the frequency-domain representation of the left and right channel of the stereo signal of one frame duration for one pair of playback channels or speakers.

A time-frequency tile weighting control module 115 may generate the weighting factors w(p,b) that are applied to the corresponding PxB tiles of the stereo signal to generate the weighted time-frequency tiles for the P output channel pairs. The weighting factors w(p,b) control spatial rendering to create a perceived direction from which the audio signal of the time-frequency tiles will be heard in the multi-channel playback system given the playback channel layout. The directional parameters received from the encoder may represent the optimum direction of virtual speaker pairs to recreate the perceived locations of dominants sounds in the sub-bands of the time-frequency tiles and may be used by the time-frequency tile weighting control module 115 to control the weighting factors w(p,b).

A time-frequency tile merger module 113 may merge the weighted PxB time-frequency tiles to transform the left and right signals of each output channel pair from the frequency domain back to the time domain. In one aspect, this operation may be the inverse of the operation of the time-frequency-tile splitter 111. The time-frequency tile merger module 113 may combine the time domain signals for the P output channel pairs to generate the audio signals for the N speakers of the multi-channel playback system. In one aspect, the number of speakers N may not be 2×P.

Figure 2:
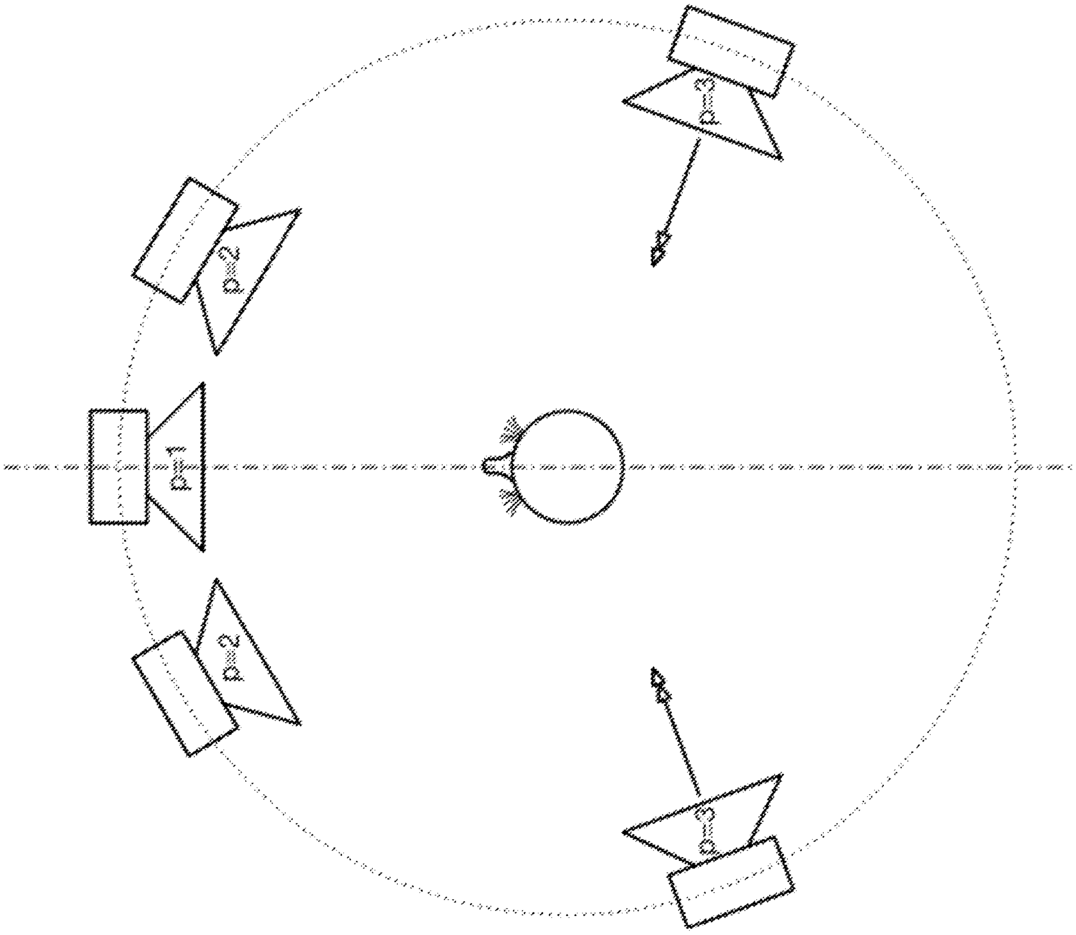
FIG. 2 depicts a top view of a five-speaker layout according to one aspect of the disclosure.

FIG. 2 depicts a top view of a five-speaker (N=5) layout of a playback system according to one aspect of the disclosure. FIG. 2 shows a 5.0 loudspeaker layout in which five loudspeakers in the median plane are laid out in a circular arrangement in the horizontal plane relative to a listener who is located in the center. A channel pair as used here refers to the channels being assigned to two loudspeakers that are located symmetrically to the left and right relative to the listener facing forward. For example, in FIG. 2 the channels assigned to the loudspeakers with p=3 belong to channel pair 3. To simplify the description, a single loudspeaker located in the median plane may have two associated channels that are added to provide the loudspeaker signal. Hence, such a loudspeaker is also associated with a channel pair (see for example loudspeaker with p=1 in FIG. 2).

If the weighting factors w(p,b) of FIG. 1 are set to zero for all the channel pairs except for p=3 (e.g., w(p,b) is set to 1 for p=3), the audio signal of the time-frequency tile is entirely routed to channel pair 3, as shown by the arrows in FIG. 2 and the listener will localize sound from that direction. The perceived sound location can be further manipulated by assigning non-zero weighting factors to more than one channel pair. For example, if the weighting factors for the channel pairs 2 and 3 have the same value, the sound will be perceived somewhere between the loudspeakers associated with those channel pairs. That is, source localization in stereo audio signals is to a large extent based on the so-called phantom image phenomenon.

Figure 3:
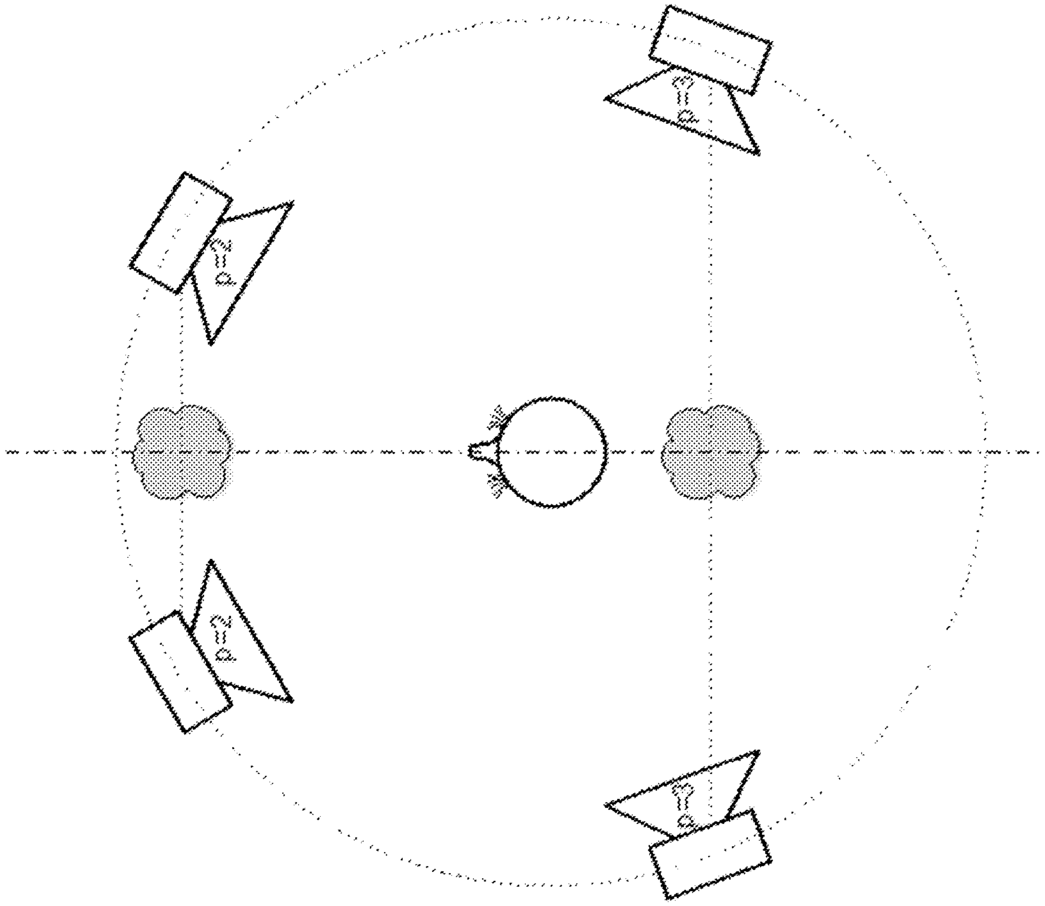
FIG. 3 depicts phantom image locations of perceived audio sources from a five-speaker layout according to one aspect of the disclosure.

FIG. 3 depicts phantom image locations of perceived audio sources from the same five-speaker (N=5) layout according to one aspect of the disclosure. The loudspeaker associated with p=1 is not shown so as not to obscure some details depicted in the figure. In FIG. 3, if the same sound is radiated by the two loudspeakers of channel pair 2 (p=2), the listener will perceive a phantom image between the two loudspeakers in front. Similarly, if the same sound signal is now radiated by pair 3 (p=3) instead, the listener will perceive the phantom image between the two loudspeakers of channel pair 3. By manipulating the weighting factors for channel pairs 2 and 3, the phantom image location may be shifted to any location between the loudspeaker pairs.

The same weighting factor may be applied to the left and right signals of a channel pair. The phantom image will then remain at the same perceived lateral position as in the stereo down-mixed signal. Since a dialog in movie soundtracks or the lead singer in a music recording is often panned to the center, it may be important to maintain the perceived location of such a main sound scene element. The spatial localization of phantom images of the STIC system includes a panning approach of the decoded stereo signal in the median plane between channel pairs of a multi-channel playback system. The panning can vary over time and frequency as supported by the tile-based processing that uses the weighting factors w(p,b), and the spatial image parameters. For example, the weighting factors w(p,b) may be derived based on an analysis of the decoded stereo signal and the directional parameters describing the directions of virtual speaker pairs to recreate the dominant sound in the sub-bands of the decoded stereo signal. In one aspect, the weighting factors w(p,b) may be used to adaptively process the time-frequency tiles to reduce or minimize spectral distortions from the spatial localization.

Synthesis of immersive audio content from a stereo signal using time-frequency tiles as described may achieve the desired spatial localization, but it may also introduce various distortions to the audio playback signals. For example, an unstable image may be perceived when concurrent sources are present in different directions. Distortions may also occur due to temporal smearing of attacks or transients in the stereo signal. There may be comb-filter effects when highly correlated signals are generated for multiple output channels. Such effects may result in large image shifts when the listener moves around. Other distortions may include coloration effects when the relative magnitudes of the various frequency components of the broadband sound are changed, or loudness modulation.

Figure 4:
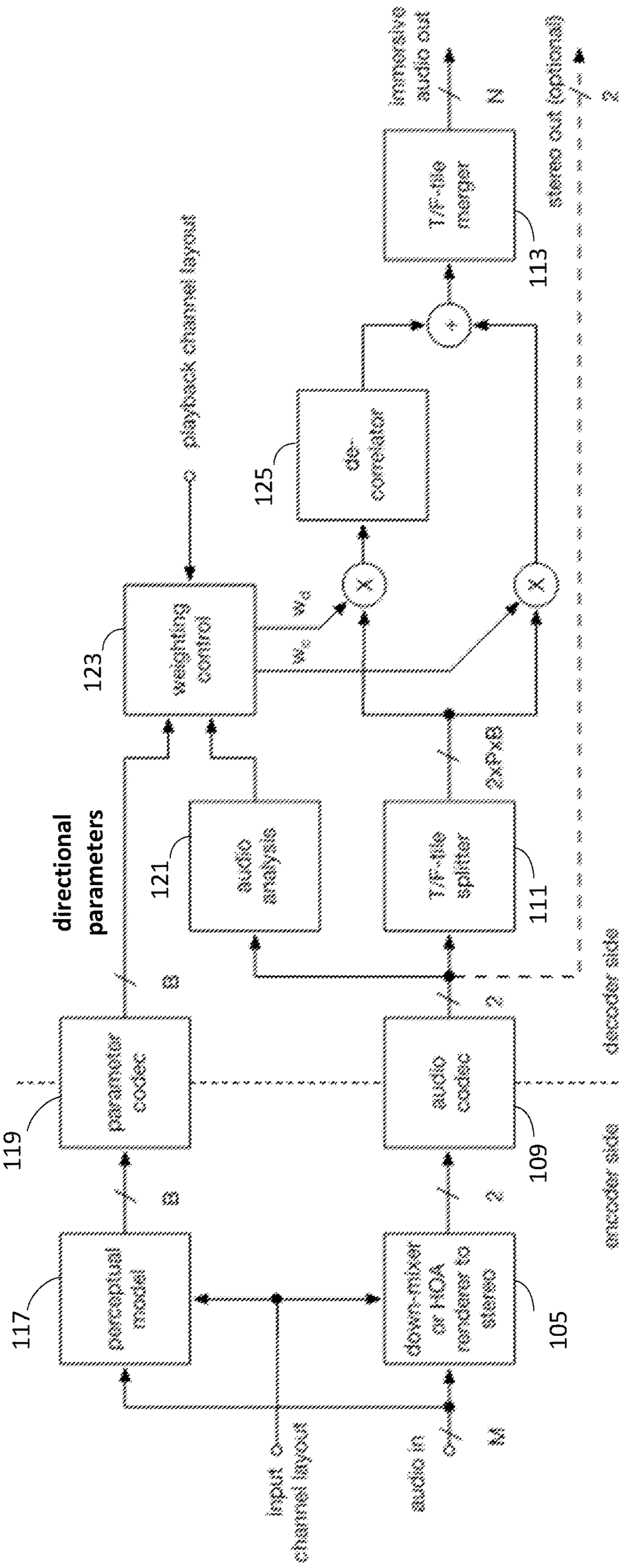
FIG. 4 is a functional block diagram of a stereo-based immersive audio coding system that includes processing modules to reduce or minimize distortions from spatial rendering according to one aspect of the disclosure.

FIG. 4 is a functional block diagram of a stereo-based immersive audio coding system that includes additional processing modules to reduce or minimize distortions from spatial localization so as to enhance audio quality according to one aspect of the disclosure. The down-mixer/renderer 105 and the audio codec 109 may be the same as in FIG. 1 and the description of these modules will not be repeated for brevity.

A perceptual model 117 derives parameters describing the optimum direction of virtual speaker pairs to recreate the perceived location of dominant sounds of the audio input signal. In one aspect, the directions of the virtual speaker pairs may be estimated for frequency sub-bands using time-frequency tiles. The spectral resolution of the frequency sub-bands used internally by the perceptual model 117 for the direction estimation may be different (e.g., higher) from those used by the time-frequency-tile splitter 111 for the decoded stereo signal. The perceptual model 117 may map the directions of virtual speaker pairs estimated for the internal frequency sub-bands to the B sub-bands of the decoded stereo signal. The direction of virtual speaker pairs for each of the B sub-bands may be given as azimuth and elevation angle in degrees relative to the default listener position. The azimuth and elevation angles may represent the optimum location of a virtual loudspeaker pair for recreating the dominant sound at the original location. A parameter codec 119 may encode the directional parameters to reduce the data rate for transmission. At the decoder side, the decoder of the parameter codec 119 may decode the received parameters to send the directional parameters to a weighting control module 123. In one aspect, the decoded stereo signal may be used as a fallback audio signal for systems that are not capable of decoding the directional parameters, that only have a stereo playback system, or where a stereo signal is preferred for headphone playback.

Figure 5:
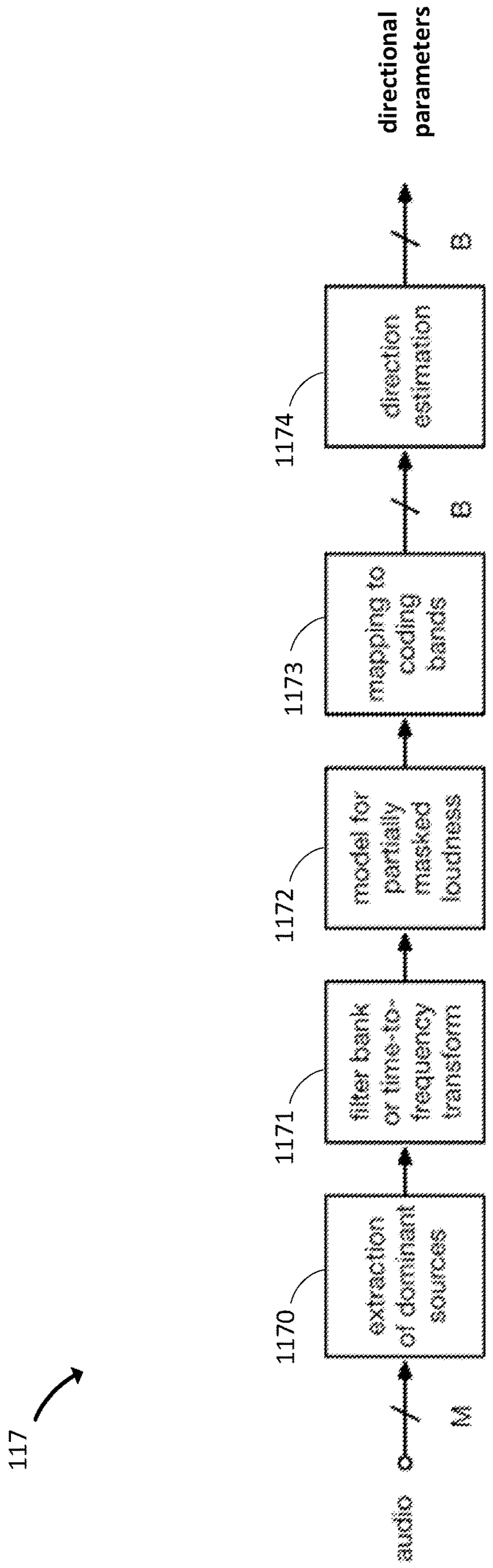
FIG. 5 is a functional block diagram of a perceptual model of the stereo-based immersive audio coding system used to estimate the directional parameters according to one aspect of the disclosure.

FIG. 5 is a functional block diagram of a perceptual model 117 of the stereo-based immersive audio coding system used to estimate the directional parameters according to one aspect of the disclosure. A dominant source extraction module 1170 may extract one or more dominant sources and their directions from the M input. For channel-based audio input, source extraction or beamforming may be applied to approximate one or more of the most dominant channel pairs and their directions. The direction may be interpolated between the channel pair directions of the most dominant channel pairs.

A filter bank or time-frequency frequency transform module 1171 may transform the one or more most dominant sources from the time domain to the frequency domain in a number of sub-bands, using techniques such as STFT. The resolution of the sub-bands may be determined by the properties of the auditory system. For example, the resolution at high frequencies may be selected to be finer in order to support sufficient spectral resolution to separate multiple sources in different directions. In one aspect, each sub-band may include a grouping of multiple frequency bins from the STFT. As mentioned, the spectral resolution used for the dominant source estimation may be higher (e.g., finer) than that for the time-frequency tiles of the decoded stereo signal. The number of sub-bands may also depend on the targeted bitrate for the transmission of the directional parameters since the required parameter data rate is roughly proportional to the number of sub-bands.

A partially masked loudness module 1172 may operate on the loudness estimate of the sub-bands of the dominant sources to account for the masking effects when multiple competing sources partially mask each other to obtain the dominant source with the largest loudness. The partially masked loudness module 1172 may model the masking effects by considering the different spatial directions. A coding bands mapping module 1173 may map the estimated loudness value in the sub-bands to the B sub-bands of the time-frequency tiles to be used for the stereo signal at the decoder side. A direction estimation module 1174 may estimate the direction of the virtual speaker pair to recreate the dominant sound location in each sub-band as azimuth and elevation angle in degrees relative to the default listener position.

In practice, the intended perceived source direction is often only known precisely for object-based audio with the corresponding metadata. In one aspect, the source extraction module 1170 is not used and the direction estimation is instead based on the metadata and the object signal loudness after the masking effect. For ambisonics, source extraction or beamforming can be applied to approximate the most dominant sources and their directions.

Figure 6:
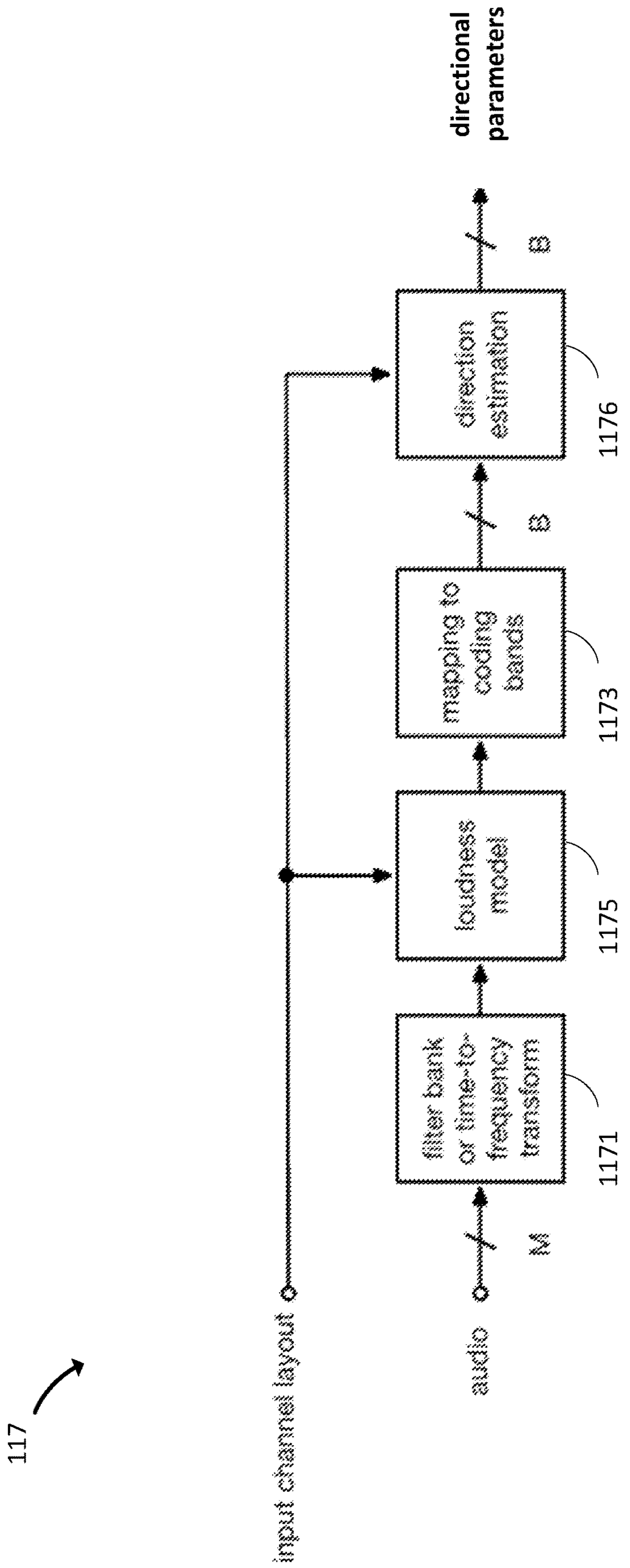
FIG. 6 is a functional block diagram of a perceptual model of the stereo-based immersive audio coding system used to estimate the directional parameters based on channel-based input according to one aspect of the disclosure.

FIG. 6 is a functional block diagram of a perceptual model 117 of the stereo-based immersive audio coding system used to estimate the dominant sound and its associated virtual speaker pair direction based on channel-based input according to one aspect of the disclosure. As in FIG. 5, a filter bank or time-frequency transform module 1171 may transform the M input sources from the time domain to the frequency domain in a number of sub-bands.

A loudness model 1175 may operate on loudness estimates from each input channel to model the masking effect and to consider the direction estimates based on the input channel layout. The loudness model 1175 may perform triangulation between the loudspeaker positions of the two or three loudest channels to account for phantom images. Thus, the direction estimation takes into account the input channel layout. Estimating the virtual speaker pair direction for the dominant sound using the channel-based input model of FIG. 6 may be more computationally efficient but potentially less accurate than the source extraction model of FIG. 5. A coding bands mapping module 1173 may map the estimated loudness value in the sub-bands to the B sub-bands of the stereo signal at the encoder side. A direction estimation module 1176 may estimate the virtual speaker pair direction in each sub-band as azimuth and elevation angle in degrees relative to the default listener position based on the input channel layout.

For object-based audio, its source direction is usually given by metadata. Object metadata commonly describes object location, size, and other properties that may be used by a renderer, such as the renderer 105 of FIG. 4, to achieve the desired source object image. Objects that are located within a segment of the sphere of the playback channel layout may be rendered into a stereo signal that will be transmitted to the decoder side as shown in FIG. 4. However, since the object locations are known, the perceptual model 117 may not need to estimate source directions of the objects. Instead, it uses the azimuth and elevation of the virtual channel pair to which the object or objects are rendered.

Figure 7:
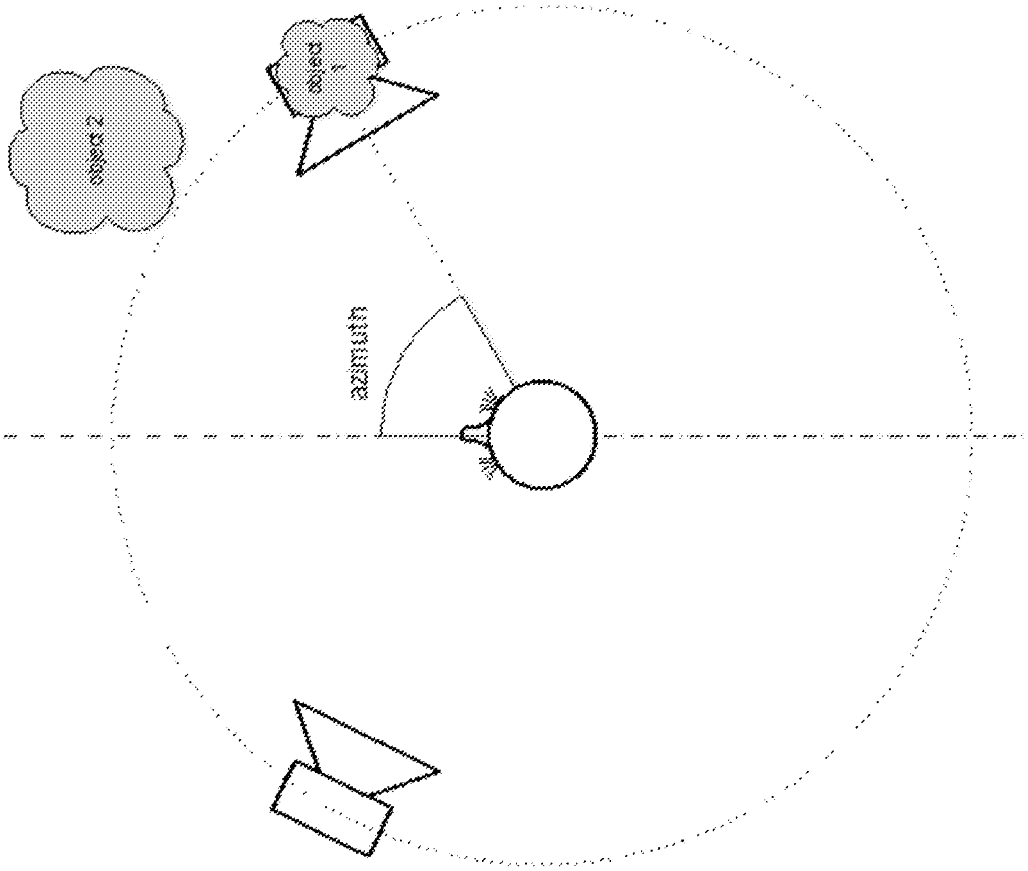
FIG. 7 depicts use of a virtual channel pair for object rendering when the perceptual model of the stereo-based immersive audio coding system uses the azimuth/elevation of the virtual channel pair as the metadata according to one aspect of the disclosure.

FIG. 7 depicts use of a virtual channel pair for object rendering when the perceptual model 117 of the stereo-based immersive audio coding system uses the azimuth/elevation of the virtual channel pair as the metadata according to one aspect of the disclosure. FIG. 7 shows a virtual channel pair and two audio objects as they appear when the rendered stereo signal is played back with the virtual channel pair. Object 1 is a dry point source which is rendered by copying the mono object signal only to the right channel. Object 2 is rendered by adding some reverberation to increase the perceived distance and some decorrelation between left and right channel and the object is panned to the right. A down-mixed signal is generated by adding the two rendered signals. The STIC metadata for the source direction is the azimuth/elevation of the virtual channel pair. This direction usually differs from the object metadata because the virtual channel pair angle is usually different from the source angle of the phantom image the virtual channel pair produces.

Objects in the same segment of the sphere may be rendered to different virtual channel pairs to achieve better spatial resolution and optimized STIC rendering quality. When multiple virtual channel pairs are used, the perceptual model 117, such as the loudness model 1175 of FIG. 6, may estimate which virtual channel pair is dominant in each time-frequency tile of the decoded stereo signal by estimating the loudness that each virtual channel pair produces after the masking effect.

For an HOA-based signal, the main dominant source signals and directions may be derived by singular value decomposition (SVD). They may then be processed by the perceptual model 117 in the same way as object signals to derive the partially masked loudness.

Referring back to FIG. 4, the weighting control module 123 may generate the weighting factors $w_c$ and $w_d$ that are applied to the corresponding PxB tiles of the stereo signal to generate the weighted time-frequency tiles for the P output channel pairs. The weighting control module 123 may control the spatial rendering by generating the weighting factors $w_c$ and $w_d$ for the PxB tiles based on the playback channel layout, the direction of virtual speaker pair for the dominant sounds, and the results of an analysis of the decoded stereo signal performed by an audio analysis module 121. The output of the time-frequency-tile splitter 111 is divided into two paths, one of which has a decorrelator that applies weighting factor $w_d$ to reduce the correlation between channel pairs. Decorrelation may be applied to reduce comb-filter effects that may cause large image shifts in the perceived audio signals when the listener moves. The amount of decorrelation may be controlled by the ratio of the weighting factors $w_c$ and $w_d$.

Figure 8:
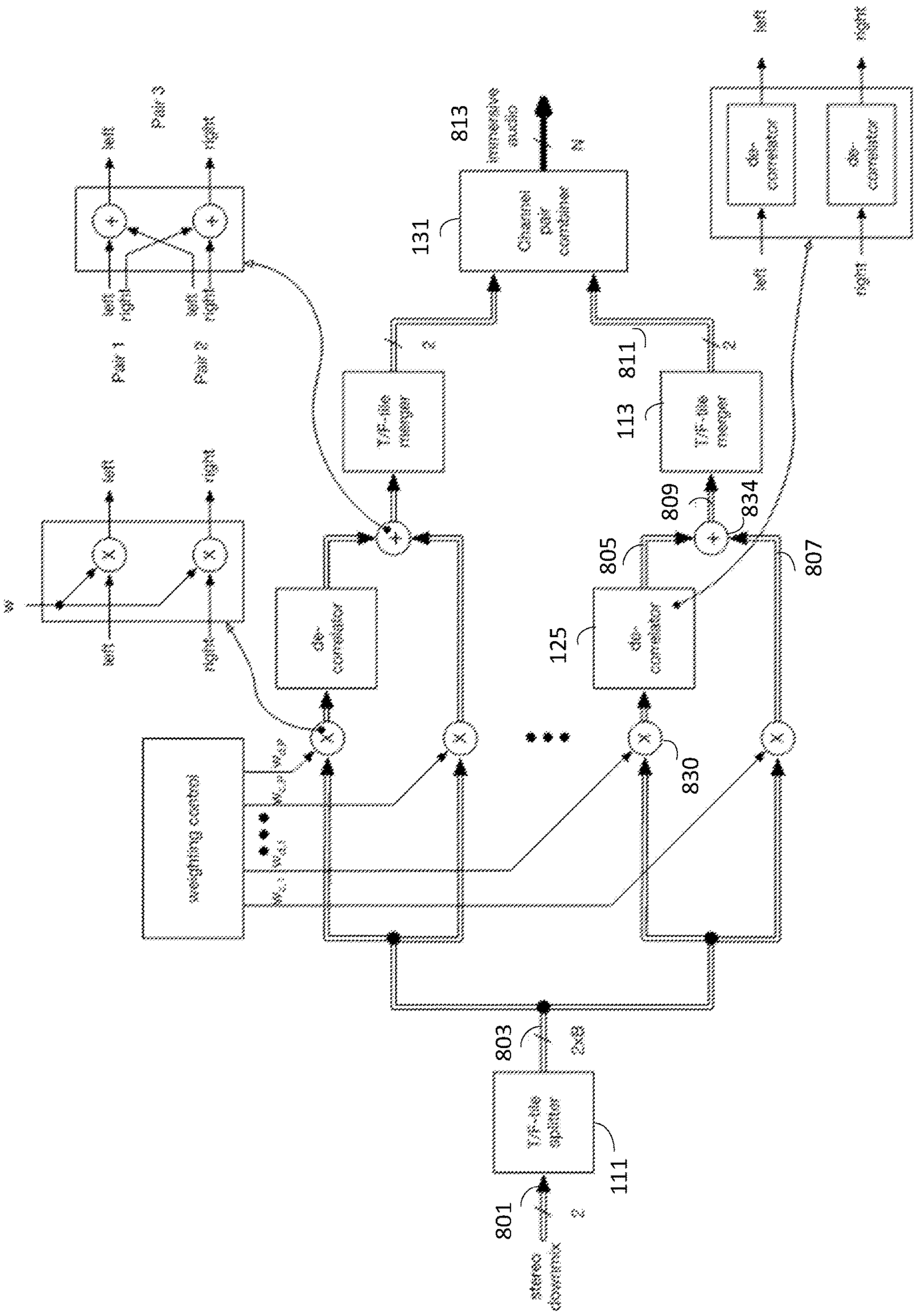
FIG. 8 is a functional block diagram of the decoder processing of channel pairs of the stereo-based immersive audio coding system according to one aspect of the disclosure.

FIG. 8 is a functional block diagram of the processing of channel pairs of the stereo-based immersive audio coding system according to one aspect of the disclosure. The decoded stereo down-mixed signal 801 may be partitioned into frames and processed by the time-frequency-tile splitter 111 to transform the left and right signals from the time domain into B sub-bands in the frequency domain. The left and right signals 803 for the B sub-bands are fed into P parallel processing units representing the P pairs of output channels. Each processing unit may contain two multipliers 830, a decorrelator 832, adder 834, and time-frequency-tile merger module 836. In a processing unit, the left and right signals 803 may be subject to identical processing in parallel for the left and right channel of the pair.

The left and right signals 803 in each processing unit are divided into two paths, one path multiplied by the weighting factor $w_c$ and a second path that is a decorrelator path multiplied by the weighting factor $w_d$. The weighting factors $w_c$ and $w_d$ for the P pairs of output channels may be indexed $\{w_{c,1}, w_{c,2}, \ldots w_{c,P}\}$ and $\{w_{d,1}, w_{d,2}, \ldots w_{d,P}\}$, respectively. In one aspect, the same set of $\{w_{c,1}, w_{c,2}, \ldots w_{c,P}\}$ and $\{w_{d,1}, w_{d,2}, \ldots w_{d,P}\}$ may be applied across all B sub-bands of the signals 803. The output from the multiplier 830 for the decorrelator path is applied to the decorrelator 125. The decorrelator 125 in each processing unit filters the wa-weighted signal of the left and right signals to decorrelate the corresponding channel pair from all other channel pairs, but it is not intended to change the correlation between the left and right channels of the pair. The left and right signals of the decorrelated output 805 from the decorrelator 125 is summed with the corresponding left and right signals of the unprocessed output 807 from the $w_c$-weighted path by the adder 834 to generate the weighted output signal 809 for the channel pair. By weighted adding of the decorrelated output 805 and the unprocessed output 807 of the channel pair in the adder 834, the ratio of the weighting factors $w_c$ and $w_d$ for each channel pair may control the amount of decorrelation of the weighted output signal 809 for the channel pair.

The processing unit may perform weighted adding of the decorrelated output 805 and the unprocessed output 807 to generate the weighted output signal 809 for each of the B sub-bands. The time-frequency tile merger module 113 transforms the weighted output signal 809 for the B sub-bands of each channel pair from the frequency domain back to the time domain to generate the channel pair signal 811. The channel pair combiner module 131 combines the channel pair signal 811 from the P channel pairs of the output channel layout to generate the audio signals 813 for the N speakers of the playback system. In one aspect, N may be equal to 2×P and the left and right signals of each channel pair signal 811 may drive the left and right speakers of the corresponding channel pair. In one aspect, the left and right signals may be combined to drive a single speaker.

Represented in mathematical terms for an implementation of the processing based on STFT, the time-frequency-tile splitter 111 converts the left and right channel signals of the stereo down-mixed signal 801, $l_{mix}$ and $r_{mix}$, to the STFT representation:

$$L_{mix}(k)=\mathrm{STFT}(l_{mix}(n))$$

$$R_{mix}(k)=\mathrm{STFT}(r_{mix}(n)) \quad \text{(Eq. 1)}$$

where n is the time domain sample index and k is the STFT bin index.

The weighted output signal 809 of each channel pair is computed by adding the decorrelated output 805 and the unprocessed output 807 to yield:

$$L_{out}(p,k)=w_c(p,b)L_{mix}(k)+\mathrm{Decorr}(w_d(p,b)L_{mix}(k))$$

$$R_{out}(p,k)=w_c(p,b)R_{mix}(k)+\mathrm{Decorr}(w_d(p,b)R_{mix}(k)) \quad \text{(Eq. 2)}$$

where p is the channel pair index, b is the sub-band index, $w_c(p,b)$ is the weighting factors $w_c$ and $w_d(p,b)$ is the weighting factor $w_d$ for channel pair p and sub-band b. Each sub-band may include a grouping of STFT bins.

The time-frequency tile merger module 113 transforms the complex STFT spectra of the weighted output signal 809 back to the time domain of the channel pair signal 811:

$$l_{out}(p,n)=\mathrm{STFT}^{-1}(L_{out}(p,k))$$

$$r_{out}(p,n)=\mathrm{STFT}^{-1}(R_{out}(p,k)) \quad \text{(Eq. 3)}$$

The weighting factors $w_c$ and wa may be calculated by:

$$w_{Pan}(p,b)=\mathrm{PanningWeight}(\alpha,\varepsilon) \quad \text{(Eq. 4)}$$

$$w(p,b,f)=(1-w_{smooth})w_{Pan}(p,b)+w_{smooth}w_{Pan}(p,b,f-1) \quad \text{(Eq. 5)}$$

$$w_c(p,b)=\sqrt{w_{corr}}\,w(p,b,f) \quad \text{(Eq. 6)}$$

$$w_d(p,b)=\sqrt{1-w_{corr}}\,w(p,b,f) \quad \text{(Eq. 7)}$$

where PanningWeight( ) is a function to compute the panning weight factor $w_{Pan}(p,b)$ for channel pair p and sub-band b based on the transmitted azimuth α and elevation ε, given the geometry of the target channel layout. In one aspect, the azimuth α and elevation ε may include that of the virtual speaker pair to recreate the dominant source received from the perceptual model 117. For example, the left speaker of the virtual pair is located at {−α, ε} and the right speaker at {α, ε}. To reduce or minimize spectral distortions due to spatial rendering, temporal smoothing of the weighting factors may be performed. $w_{smooth}$ is a smoothing factor that may depend on the signal characteristics of the down-mixed signal 801, for example the prediction gain and attack strength from the signal analysis performed by the audio analysis module 121. In one aspect, $w_{smooth}$ may be the same for all P channel pairs and B sub-bands. The weighting coefficient $w_{corr}$ controls how much decorrelation is applied by controlling the ratio between $w_c(p,b)$ and $w_d(p,b)$. Weighting coefficients $w_{corr}$ may also depend on the prediction gain and attack strength of the down-mixed signal 801. In one aspect, $w_{corr}$ may be the same for all P channel pairs and B sub-bands. The frame index f indicates the current STFT frame. Smoothing of the w(p, b, f) may be performed over subsequent frames. In one aspect, $w_{Pan}(p, b)$, w(p, b, f), $w_c(p, b)$, and $w_d(p, b)$ may be independent of the sub-bands.

Figure 9:
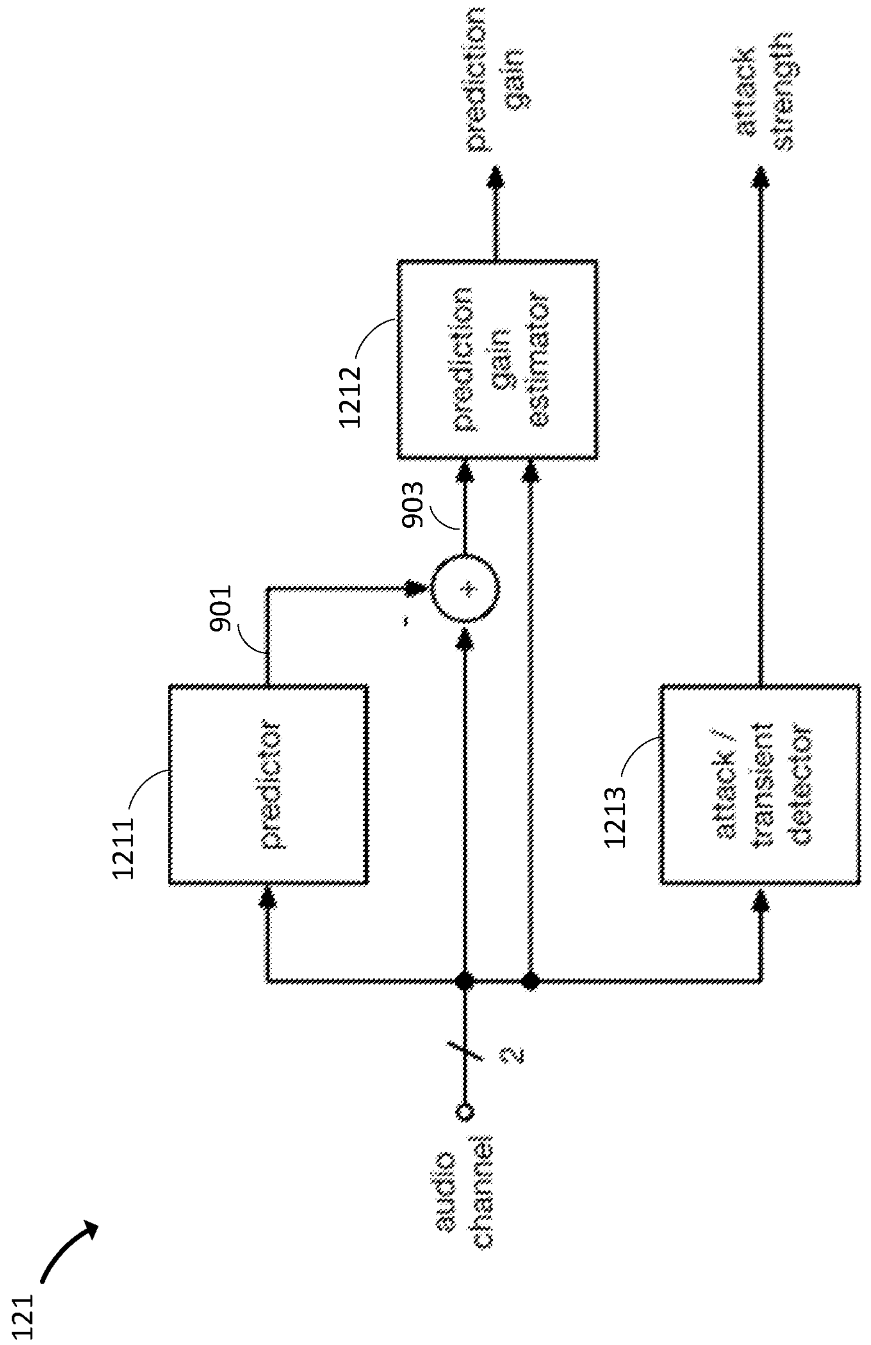
FIG. 9 is a functional block diagram of the audio analysis module of the stereo-based immersive audio coding system used to adjust the weighting factors according to one aspect of the disclosure.

FIG. 9 is a functional block diagram of the audio analysis module 121 of the stereo-based immersive audio coding system used to adjust the weighting factors according to one aspect of the disclosure. Each channel of the decoded stereo signal, such as the stereo down-mixed signal 801, may be processed in the time domain by a forward predictor 1211. The forward predictor 1211 may generate a predicted signal 901 that is subtracted from the actual decoded stereo signal to generate a prediction error signal 903. A prediction gain estimator 1212 may estimate the prediction gain based on the estimated difference of the RMS level of the decoded stereo signal and the prediction error signal 903. In parallel, an attack/transient detector 1213 evaluates the envelope of the decoded stereo signal to estimate the strength of attack. The maximum of the results from both channels is used for further processing.

The prediction gain is an indication of the temporal "smoothness" of the decoded audio signal. For an audio signal with high prediction gain, more smoothing of the weighting factors may be needed. Temporal smoothing of the weighting factors $w_c$ and $w_d$ may then be increased and more decorrelation may be applied. On the other hand, if the attack strength is significant, temporal smoothing of the weighting factors $w_c$ and $w_d$ may be reduced and less decorrelation may be applied. If the attack strength is high, the audio signal of a time-frequency tile may be mostly restricted to a single playback channel pair to avoid temporal smearing and spectral distortions. Thus, the weighting factors $w_c$ and $w_d$ may be restricted such that only one channel pair carries the majority of the signal energy while all other channel pairs have negligible energy. In one aspect, the encoder side may perform the signal analysis on the stereo signal to estimate its attack strength and prediction gain. The encoder side may transmit parameters corresponding to the attack strength and the prediction gain of the encoded stereo signal to the decoder for use as described.

Figure 10:
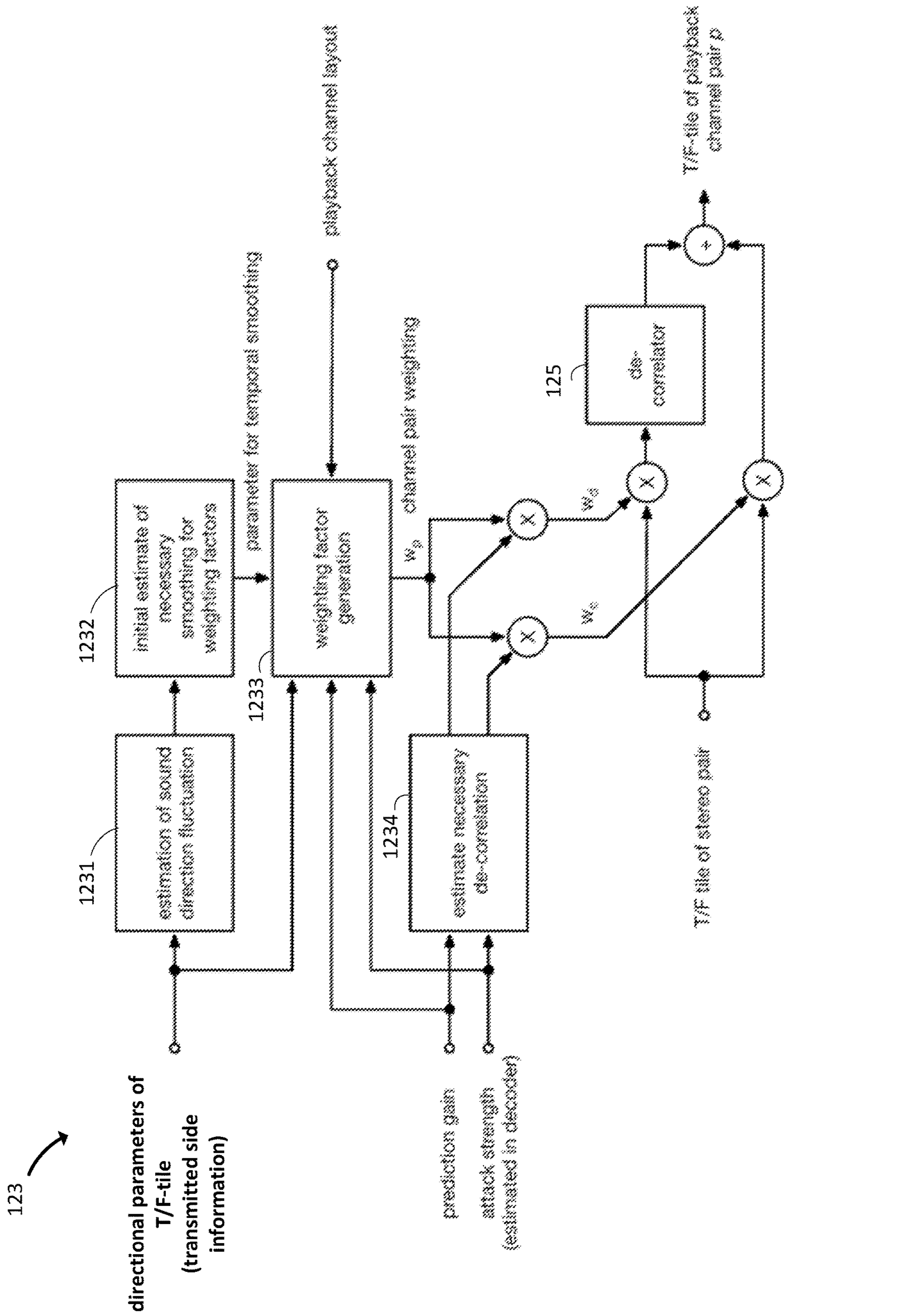
FIG. 10 is a functional block diagram of the weighting control module used to generate the weighting factors for the time-frequency tiles according to one aspect of the disclosure.

FIG. 10 is a functional block diagram of the weighting control module 123 used to generate the weighting factors for the time-frequency tiles according to one aspect of the disclosure. A first estimator module 1231 may estimate the temporal fluctuation of the directional parameters for the time-frequency tiles. A second estimator module 1232 may compute an initial estimate of the parameters for temporal smoothing of the weighting factors, such as the smoothing factor $w_{smooth}$ in Equation 5, based on the estimated temporal fluctuation of the directional parameters from the first estimator module 1231. A weighting factor generation module 1233 may generate the weighting factors, such as the w(p, b, f) of Equation 6 for the P channel pairs and the B sub-bands of the frame f, based on the initial estimate of the temporal smoothing parameter, the azimuth α and elevation ε of the virtual speaker pair for the sub-bands received through the directional parameters, the prediction gain and attack strength from the audio analysis module 121, and the playback channel layout.

A decorrelation estimator module 1234 may control how much decorrelation is applied by generating the weighting coefficient $w_{corr}$ of Equations 6 and 7 based on the prediction gain and attack strength as described. As mentioned, decorrelation may be applied to avoid comb-filter effects that can cause large image shifts when the listener moves. These effects are most apparent in signals with smooth envelope and high prediction gain. When de-correlation is applied, however, it may also result in increased audible reverberation and signal sources may appear further away compared with the input signal.

Due to the modifications of the perceived distance and reverberation, the use of decorrelation is reduced or minimized and applied only when necessary. This may be accomplished by the decorrelation estimator module 1234 using the prediction gain and attack strength parameters to control the decorrelation through the generation of the weighting coefficient $w_{corr}$. The weighting coefficient $w_{corr}$ may be applied to the w(p, b, f) from the weighting factor generation module 1233 to generate the $w_c(p, b)$ and $w_d(p, b)$ of Equations 6 and 7. The weighting factors $w_c(p, b)$ and $w_d(p, b)$ may be used to adaptively process the time-frequency tiles to reduce or minimize spectral distortions from the spatial localization.

Since the weighting factor wd is applied to the time-frequency tiles before the decorrelator 125 and not after, only those parts of the decoded stereo signal that need to be decorrelated enter the decorrelator 125. If the weighting factor wd were to be applied after the decorrelator 125 and not before, large attacks that would not need decorrelation may be temporarily spread into parts of the decoded stereo signal that need decorrelation and thus may lead to reverberation artifacts. In addition, the use of the decorrelator 125 may be reduced or minimized in each time-frequency tile by excluding the output channel pair with the largest energy from the decorrelator processing. This is possible since this channel pair is not correlated to any other channel pair that was processed by the decorrelator 125.

The weighting factors may be balanced so that the input signal loudness is preserved. In one aspect, as a first approximation, the RMS value of the weighting factors for all P channel pairs in a time-frequency tile may be set to 1. More accurate loudness matching and prevention of coloration may be possible by using a frequency-dependent exponent σ between 1.0 and 2.0 for the normalization that has smaller values at lower frequencies:

$$(\Sigma_p[w_c^{\sigma}(p)+w_d^{\sigma}(p)])^{1/\sigma}=1 \quad \text{(Eq. 8)}$$

where $w_c(p)$ and $w_d(p)$ are the $w_c(p, b)$ and $w_d(p, b)$ for a specific sub-band.

The stereo-based immersive audio coding system of FIG. 4 is based on a single stereo down-mix of the audio content. That means, for example, that any rear channel content may be mixed with front channel content, which in turn can lead to a different localization after spatial rendering if the signals overlap in time and frequency. To improve the localization accuracy, it is possible to use multiple down-mixes, where each down-mix includes only those signals that are located in a sector of the sphere that is represented by the down-mix. All sectors may cover the whole sphere without overlap.

Figure 11:
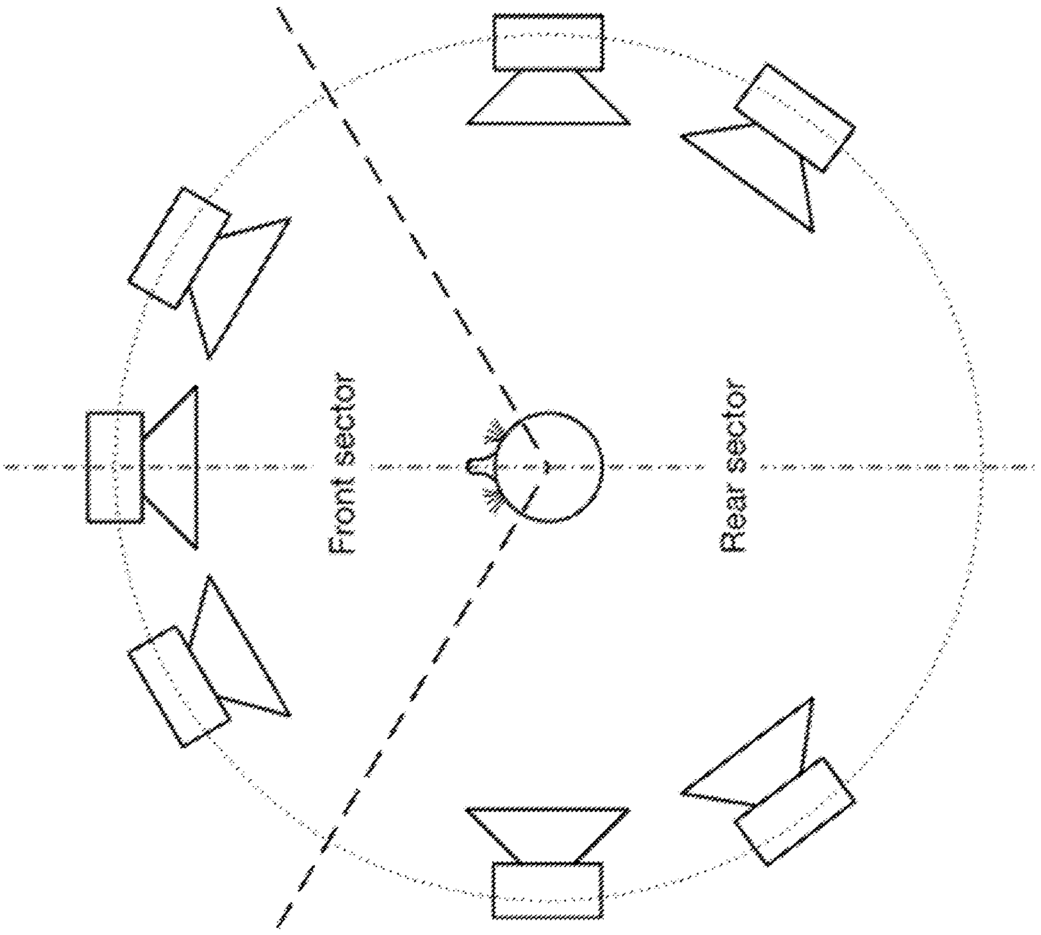
FIG. 11 depicts down-mixing of audio channels for multiple sectors of a seven-speaker layout according to one aspect of the disclosure.

FIG. 11 depicts down-mixing of audio channels for multiple sectors of a seven-speaker layout according to one aspect of the disclosure. FIG. 11 shows an example where two down-mixes are generated, one for the channels in the front sector and one for the channels in the rear sector of a 7.0 layout. For layouts with height channels such as 7.0.4, the height channels may be assigned to the sectors using the same map, for example.

Figure 12:
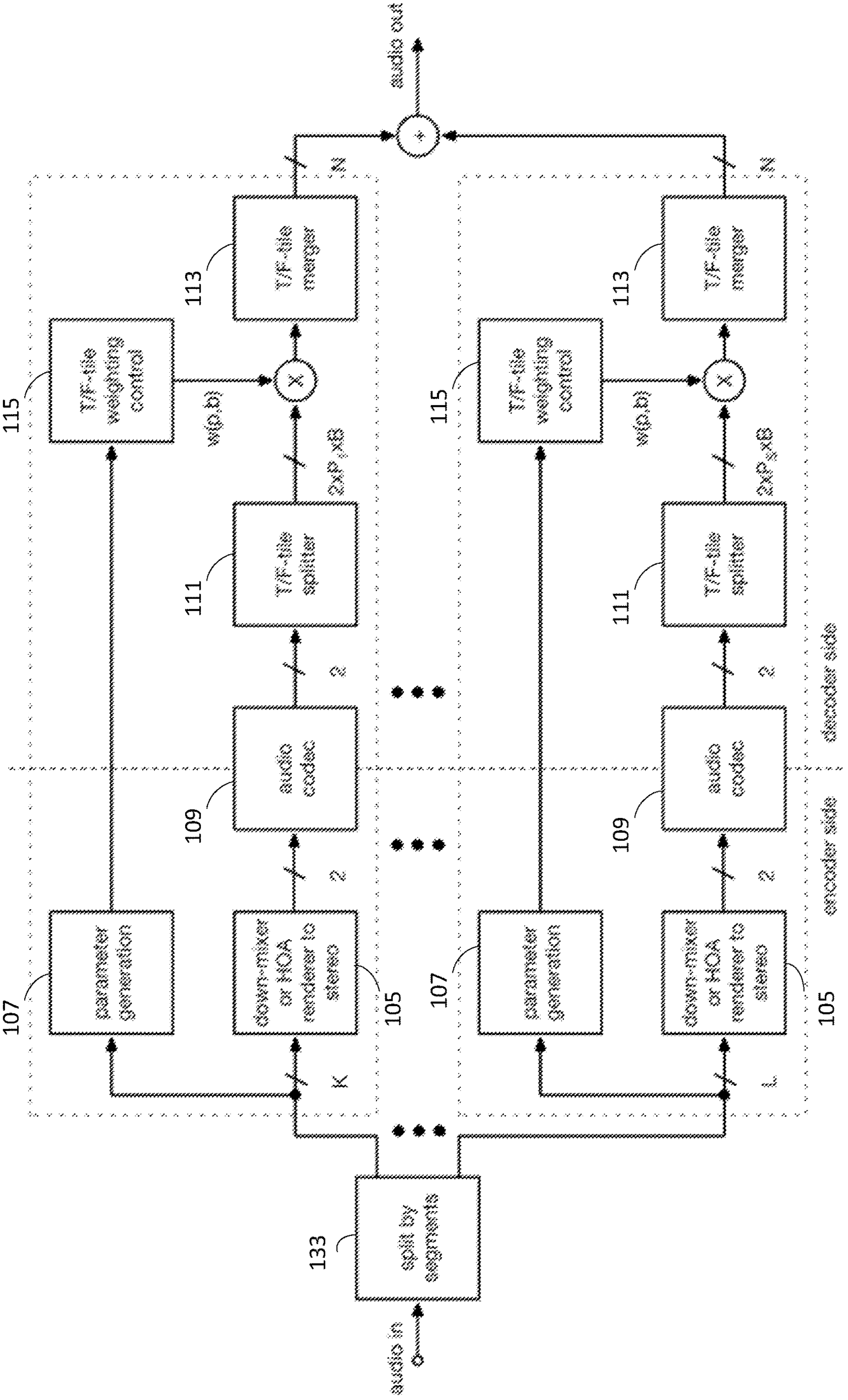
FIG. 12 is a functional block diagram of a stereo-based immersive audio coding system that encodes and decodes multiple segments or sectors of a speaker layout according to one aspect of the disclosure.

FIG. 12 is a functional block diagram of a stereo-based immersive audio coding system that encodes and decodes multiple segments or sectors of a speaker layout according to one aspect of the disclosure. A segment splitting module 133 may split the sphere of the channel layout into multiple segments or sectors. Multiple instances of the STIC system of FIG. 1 are used to encode the signals associated with various segments of the sphere. On the decoder side, the audio output signals from the various segments are added to generate the final audio output of the playback system. In one aspect, multiple instances of the STIC system of FIG. 4 may be used to encode and decode signals associated with multiple segments. In general, the segments may have an arbitrary number and arbitrary shape. However, for channel-based audio, segments will commonly be symmetrical across the median plane. To achieve a good bitrate versus quality tradeoff, the number of segments should be as small as possible, but large enough to achieve the desired localization accuracy.

In one aspect of a hybrid stereo-based immersive audio coding system, it may be advantageous to remove a channel, such as a front center channel, from the remaining channels when applying the STIC technique. The front center channel may be encoded independently of the STIC system, decoded, and added to the remaining channels rendered using the STIC system of FIG. 4. This hybrid configuration may improve the rendered image of the front center channel, which is often used for dialog in movie and TV content.

Figure 13:
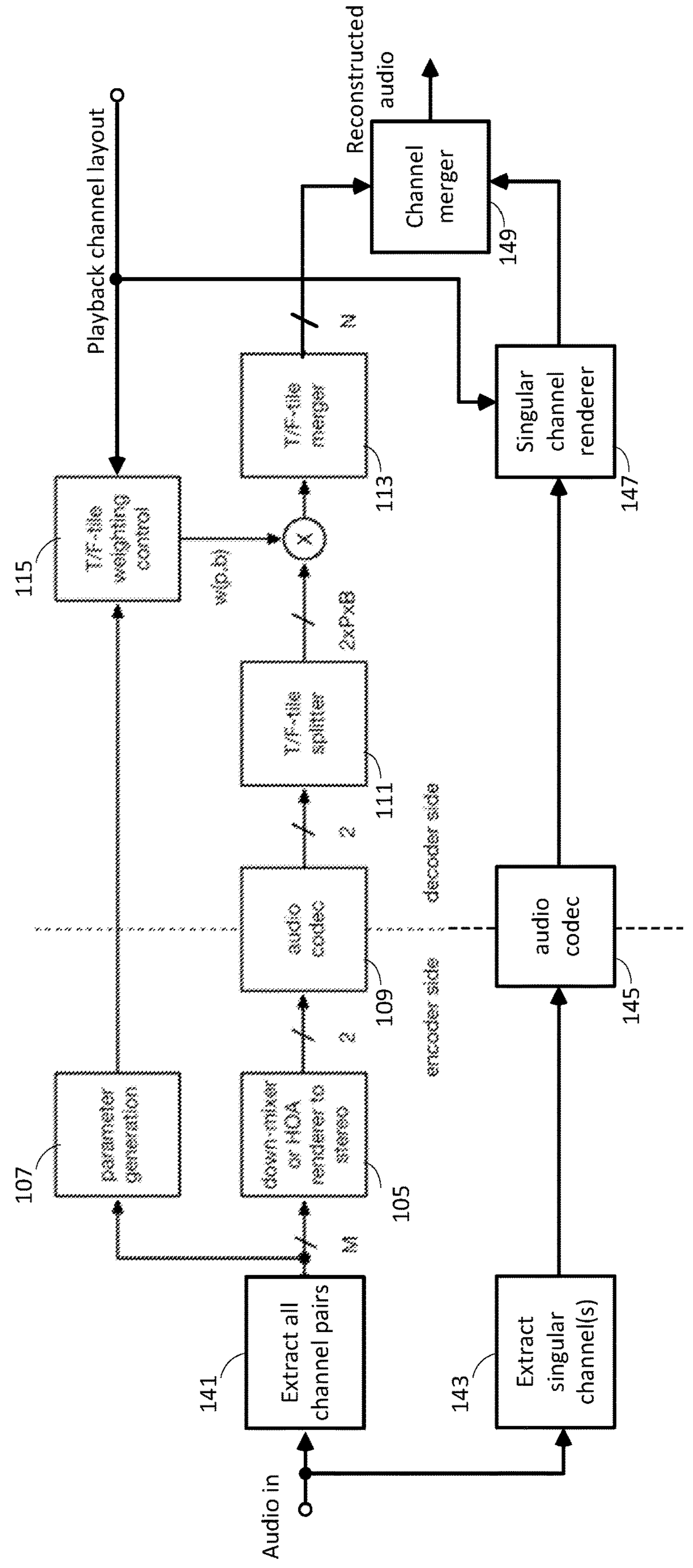
FIG. 13 is a functional block diagram of a hybrid stereo-based immersive audio coding system that encodes and decodes singular channels such as a center channel independently from other channels that are encoded and decoded using the STIC system according to one aspect of the disclosure.

FIG. 13 is a functional block diagram of a hybrid stereo-based immersive audio coding system that encodes and decodes singular channels such as a center channel independently from other channels that are encoded and decoded using the STIC system according to one aspect of the disclosure. In one example, the input channels for a surround signal may have a 5.1 layout, including 2 channel pairs (one pair of left and right channels, one pair of left surround and right surround channels) and two singular channels (center and LFE).

A channel pair extraction module 141 may extract all channel pairs such as the pair of left and right channels and the pair of left surround and right surround channels for encoding by the STIC system of FIG. 1, 4, or 12. A singular channel extraction module 143 may extract the singular channels such as the center and the LFE to be encoded independently of the STIC system. In one aspect, an audio codec 145 may encode the extracted singular channels. Information about the presence and location of the singular channels may be added to the STIC parameters so that the decoder may properly render the channels.

At the decoder side, the singular channels may be decoded by the decoder of the audio codec 145. A singular channel renderer 147 may render the decoded singular channels to the output layout as indicated by the playback channel layout. For example, if the output layout has a speaker position at the singular channel position, such as a front center speaker, the decoded singular channel for the center channel may be passed through to the front center speaker. Otherwise, the decoded singular channel for the center channel may be rendered to the closest channels available. In one aspect, a virtual sound source positioning technique such as the vector based amplitude panning (VBAP) may be used.

A channel merger module 149 may add the rendered singular channels to the channel pairs rendered by the STIC system to generate the reconstructed audio signals. For example, the channel merger module 149 may route the rendered signal for the singular center channel to the front center channel if the playback channel layout has a front center channel or the channel merger module 149 may add the signal for the singular center channel rendered to a channel pair to the corresponding channel pair signals rendered by the STIC system. In one aspect, the singular channel(s) for the LFE may be routed to the LFE channel(s) of the playback channel layout if the LFE channels(s) are present.

Figure 14:
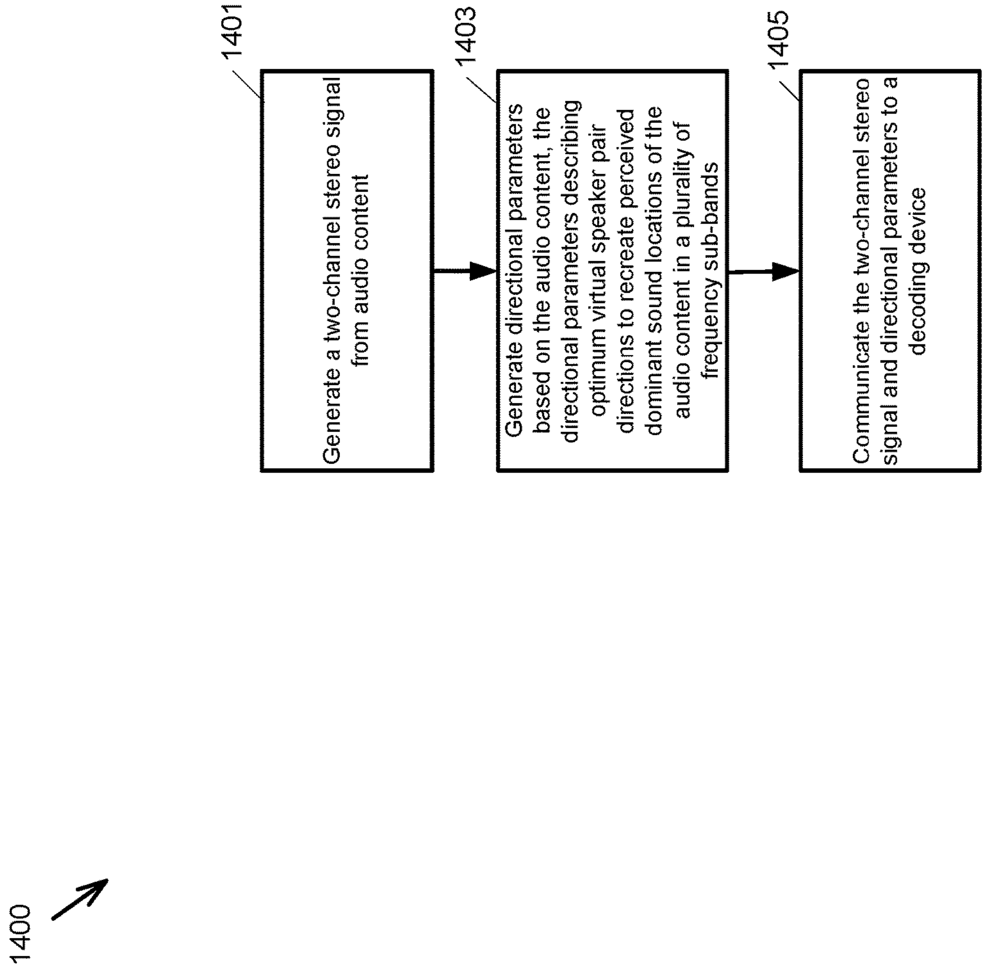
FIG. 14 is a flow diagram of a method of encoder side processing of a stereo-based immersive audio coding system to generate a stereo signal and directional parameters from an immersive audio signal according to one aspect of the disclosure.

FIG. 14 is a flow diagram of a method 1400 of encoder side processing of a stereo-based immersive audio coding system to generate a stereo signal and directional parameters from an immersive audio signal according to one aspect of the disclosure. The method 1400 may be practiced by the encoder side of the STIC system of FIG. 1, 4, 12, or 13.

In operation 1401, the method 1400 generates a two-channel stereo signal from the immersive audio signal. The immersive audio signal may include multiple audio channels of an input channel layout, multiple audio objects, or HOA. In one aspect, a down-mixer module may down-mix the multi-channel input to the stereo signal or a renderer module may render the multiple audio objects or HOA to the stereo signal.

In operation 1403, the method 1400 generates directional parameters based on the audio content, the directional parameters describing the optimum virtual speaker pair directions to recreate the perceived dominant sound location of the audio content in multiple frequency sub-bands. The virtual speaker pair directions for each of the sub-bands may be given as azimuth and elevation angles in degrees relative to the default listener position.

In operation 1405, the method 1400 transmits the two-channel stereo signal and the directional parameters over a communication channel to a decoding device. The communication channel may be bandwidth-limited. The bandwidth requirement of the directional parameters may be significantly lower than the bandwidth requirement for a single audio channel of the stereo signal.

Figure 15:
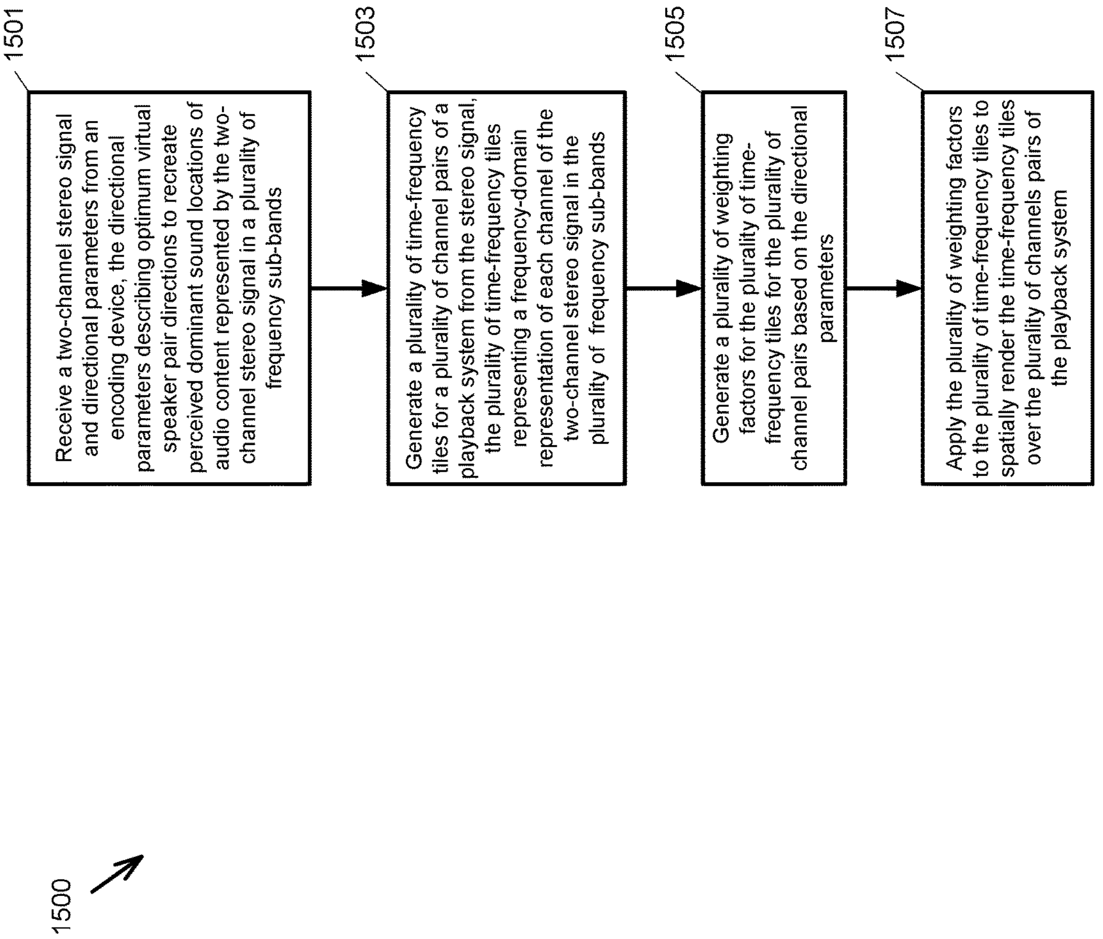
FIG. 15 is a flow diagram of a method of decoder side processing of a stereo-based immersive audio coding system to reconstruct an immersive audio signal for a multi-channel playback system according to one aspect of the disclosure.

FIG. 15 is a flow diagram of a method 1500 of decoder side processing of a stereo-based immersive audio coding system to reconstruct an immersive audio signal for a multi-channel playback system according to one aspect of the disclosure. The method 1500 may be practiced by the decoder side of the STIC system of FIG. 1, 4, 12, or 13.

In operation 1501, the method 1500 receives a two-channel stereo signal and directional parameters from an encoding device, the directional parameters describing the optimum virtual speaker pair directions to recreate the perceived dominant sound location of audio content represented by the two-channel stereo signal in a number of frequency sub-bands. The audio content may be an immersive audio signal of multiple channels.

In operation 1503, the method 1500 generates multiple time-frequency tiles for a number of channel pairs of a playback system from the two-channel stereo signal, the multiple time-frequency tiles representing a frequency-domain representation of each channel of the two-channel stereo signal in multiple frequency sub-bands. The number of sub-bands B may be determined by the desired spectral resolution. The two-channel stereo signal may be partitioned into frames to be represented by the time-frequency tiles. The frequency-domain representation of the stereo signal may be split or copied into P parallel processing path, where each processing path may be associated with each channel pair of the playback system.

In operation 1505, the method 1500 generates weighting factors for the multiple time-frequency tiles of the multiple channel pairs based on the directional parameters. In one aspect, the weighting factors may be generated based on the virtual speaker pair directions to recreate the perceived dominant sound location of audio content represented by the two-channel stereo signal in the multiple frequency sub-bands, an analysis of the stereo signal, and the output channel layout of the playback system. In one aspect, the weighting factors may be controlled to reduce the correlation between the channel pairs.

In operation 1507, the method 1500 applies the multiple weighting factors to the multiple time-frequency tiles to spatially render the time-frequency tiles over the multiple channel pairs of the playback system. The weighting factors may be used to adaptively process the time-frequency tiles, such as using a decorrelator, to reduce or minimize spectral distortions from the spatial rendering.

Embodiments of the stereo-based immersive audio coding technique described herein may be implemented in a data processing system, for example, by a network computer, network server, tablet computer, smartphone, laptop computer, desktop computer, other consumer electronic devices or other data processing systems. In particular, the operations described for the stereo-based immersive coding system are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A method of encoding audio content, the method comprising:

generating, by an encoding device, a two-channel stereo signal from the audio content;

generating, by the encoding device, one or more directional parameters based on the audio content, each directional parameter of the one or more directional parameters describing a direction of a respective virtual speaker pair wherein one or more of the respective virtual speaker pairs together recreate a perceived dominant sound location of the audio content in a respective one of a plurality of frequency sub-bands, wherein the respective virtual speaker pair is a pair of virtual speakers that are located symmetrically to the left and right relative to a listener facing forward axis; and communicating the two-channel stereo signal and the directional parameters over a communication channel or through a storage device to a decoder.

2. The method of claim 1, wherein the audio content comprises one or more of a multi-channel signal associated with a speaker layout, a plurality of audio objects, or ambisonics of any order.

3. The method of claim 1, wherein generating the directional parameters comprises:

transforming, by the encoding device, the audio content provided by a multi-channel signal associated with a speaker layout into a plurality of sub-bands of a frequency-domain representation of the audio content; and determining, by the encoding device, a largest loudness of the audio content using a loudness masking model for each of the plurality of sub-bands based on the speaker layout associated with the multi-channel signal, wherein the perceived dominant sound location is that of the largest loudness.

4. The method of claim 1, wherein each of the directional parameters comprises an azimuth angle and an elevation angle relative to a default listener position.

5. The method of claim 1, wherein generating the directional parameters comprises:

rendering, by the encoding device, the audio content provided by a plurality of audio objects to one or more virtual channel pairs to create images of the plurality of audio objects; and determining, by the encoding device, a largest loudness of the images of the plurality of audio objects created by the one or more virtual channel pairs, wherein the perceived dominant sound location is that of the largest loudness.

6. The method of claim 1, further comprising:

dividing the audio content into a plurality of segments based on a layout of a plurality of audio sources providing the audio content, wherein generating the two-channel stereo signal from the audio content comprises:

generating a plurality of two-channel stereo signals corresponding respectively to the audio content in the plurality of segments;

wherein generating the directional parameters comprises:

generating a plurality of directional parameters corresponding respectively to the audio content in the plurality of segments, each of the plurality of directional parameters describing the directions of virtual speaker pairs to recreate the perceived dominant sound locations of the audio content in a corresponding one of the plurality of segments in a plurality of frequency sub-bands, and wherein communicating the two-channel stereo signal and the directional parameters comprises:

communicating the plurality of two-channel stereo signals and the plurality of directional parameters over the communication channel or through the storage device to the decoder.

7. The method of claim 1, further comprising:

analyzing the two-channel stereo signal to generate content analysis parameters; and communicating the content analysis parameters to the decoder.

8. The method of claim 7, wherein the content analysis parameters comprise parameters representing a prediction gain and an attack strength of the stereo signal.

9. A system configured to decode audio content, the system comprising:

a memory configured to store instructions;

a processor coupled to the memory and configured to execute the instructions stored in the memory to:

decode a two-channel stereo signal that was generated from an audio content received via a communication channel or through a storage device;

receive one or more directional parameters that were generated based on the audio content, each directional parameter of the one or more directional parameters describing a direction of a respective virtual speaker pair wherein the respective virtual speaker pair is a pair of virtual speakers that are located symmetrically to the left and right relative to a listener facing forward axis and wherein one or more of the respective virtual speaker pairs together recreate a perceived dominant sound location of the audio content in a respective one of a plurality of frequency sub-bands; and process the two-channel stereo signal for spatial rendering, by applying weighting factors to generate one or more playback channel pairs, the weighting factors being controlled using the one or more directional.

10. The system of claim 9, wherein the audio content comprises one or more of a multi-channel signal associated with a speaker layout, a plurality of audio objects, or ambisonics of any order.

11. The system of claim 9, wherein to process the two-channel stereo signal for spatial rendering, the processor further executes the instructions stored in the memory to:

analyze the two-channel stereo signal and the directional parameters to reduce the correlation between the one or more playback channel pairs by generating the weighting factors for decorrelation in each time-frequency tile.

12. The system of claim 9, wherein each of the directional parameters comprises an azimuth angle and an elevation angle.

13. The system of claim 9, wherein to process the two-channel stereo signal for spatial rendering, the processor further executes the instructions stored in the memory to:

generate the weighting factors based on an estimate of the temporal fluctuation of a dominant perceived direction in sub-bands of a plurality of time-frequency tiles, to mitigate a distortion that is due to spatial rendering, wherein the distortion is unstable images caused by concurrent sources being present in different directions or temporal smearing of attack caused by a transient signals.

14. The system of claim 9, wherein the processor further executes the instructions stored in the memory to:

receive a plurality of two-channel stereo signals corresponding respectively to the audio content in a plurality of segments, wherein the audio content was divided into the plurality of segments based on a layout of a plurality of audio sources providing the audio content; and receive a plurality of sets of directional parameters corresponding respectively to the audio content in the plurality of segments, each set of directional parameters describing the directions of virtual speaker pairs to recreate the perceived dominant sound locations of the audio content in a corresponding one of the plurality of segments in a plurality of frequency sub-bands.

15. The system of claim 9, wherein the processor further executes the instructions stored in the memory to:

receive, via the communication channel or through the storage device, content analysis parameters that were generated based on analyzing the two-channel stereo signal.

16. The system of claim 15, wherein the content analysis parameters comprise parameters representing a prediction gain and an attack strength of the stereo signal.

17. An article of manufacture comprising machine readable non-transitory storage media that stores computer program instructions which when executed by a processor cause a data processing system to:

decode a two-channel stereo signal that was generated from audio content received via a communication channel or through a storage device;

receive one or more directional parameters that were generated based on the audio content, each directional parameter of the one or more the directional parameters describing a direction of a respective virtual speaker pair wherein the respective virtual speaker pair is a pair of virtual speakers that are located symmetrically to the left and right relative to a listener facing forward axis and wherein one or more of the respective virtual speaker pairs together recreate a perceived dominant sound location of the audio content in a respective one of a plurality of frequency sub-bands; and process the two-channel stereo signal for spatial rendering, by applying weighting factors to generate one or more playback channel pairs, the weighting factors being controlled using the one or more directional parameters.

18. The article of manufacture of claim 17 wherein the computer program instructions cause the data processing system to process the two-channel stereo signal for spatial rendering by analyzing the two-channel stereo signal and the directional parameters to reduce the correlation between the one or more playback channel pairs by generating the weighting factors for decorrelation in each time-frequency tile.

19. The article of manufacture of claim 17 wherein each of the directional parameters comprises an azimuth angle and an elevation angle.

20. The article of manufacture of claim 17 wherein to process the two-channel stereo signal for spatial rendering, the data processing system generates the weighting factors based on an estimate of the temporal fluctuation of a dominant perceived direction.

* * * * *